United States Patent [19]
Wilfinger et al.

[11] Patent Number: 5,811,484
[45] Date of Patent: Sep. 22, 1998

[54] PROCESS FOR THE PREPARATION OF WATER-DILUTABLE COATING BINDERS BASED ON ACRYLATE COPOLYMERS, AND THEIR USE

[75] Inventors: Werner Wilfinger; Ingo Kriessmann; Kurt Gossak, all of Graz, Austria

[73] Assignee: Vianova Resins Aktiengesellschaft, Werndorf, Austria

[21] Appl. No.: 663,127

[22] PCT Filed: Dec. 22, 1994

[86] PCT No.: PCT/AT94/00203

§ 371 Date: Jun. 24, 1996

§ 102(e) Date: Jun. 24, 1996

[87] PCT Pub. No.: WO95/17450

PCT Pub. Date: Jun. 29, 1995

[30] Foreign Application Priority Data

Dec. 23, 1993 [AT] Austria ................................. A 2606/93
Jul. 13, 1994 [AT] Austria ................................. A 1376/94

[51] Int. Cl.⁶ ..................................................... C08L 33/00
[52] U.S. Cl. .......................... 524/548; 524/560; 524/531; 524/556; 525/207; 525/208; 525/221; 525/222; 427/402; 427/407.1; 427/410

[58] Field of Search ...................................... 524/560, 556, 524/548, 531; 525/221, 222, 208, 207; 427/402, 407.1, 410

[56] References Cited

FOREIGN PATENT DOCUMENTS

| 328 587 | 3/1976 | Austria . |
|---|---|---|
| 379 607 | 2/1986 | Austria . |
| 388 382 | 6/1989 | Austria . |
| 388 738 | 8/1989 | Austria . |
| 0 438 090 | 7/1991 | European Pat. Off. . |
| 0 469 079 | 7/1992 | European Pat. Off. . |

*Primary Examiner*—Mark L. Warzel
*Attorney, Agent, or Firm*—Foley & Lardner

[57] ABSTRACT

A process is disclosed for preparing water-dilutable, acrylate copolymer-based lacquer binders. A polycarboxylic component is reacted with an epoxide group-containing polyhydroxylic component, and the carboxylic groups are then at least partially neutralized. As epoxide group-containing monomers for the polyhydroxylic components, glycidyl (meth)acrylate and/or glycidylallylether are used in proportions from 0.1 to 3% by weight. Associated with cross-linking components and if required with other lacquer binders, these lacquer binders are suitable for producing water-dilutable baking enamels with a low auxiliary organic solvent content.

16 Claims, No Drawings

PROCESS FOR THE PREPARATION OF WATER-DILUTABLE COATING BINDERS BASED ON ACRYLATE COPOLYMERS, AND THEIR USE

The invention relates to a process for the preparation of water-dilutable coating binders based on acrylate copolymers and to their use for the formulation of water-thinnable baking enamels having a low content of organic auxiliary solvents.

Water-dilutable binders which are obtained by partial condensation of a polycarboxy component, which is soluble in water following neutralization of the carboxyl groups, with a resin-like polyhydroxy component which is essentially not dilutable in water, and which are distinguished by favourable viscosity characteristics on dilution with water, are claimed in a series of protective documents, for example in AT Patent 328 587, AT Patent 379 607, AT Patent 388 738, AT Patent 388 382 and EP 0 496 079 A2.

The preparation of acrylate copolymers in accordance with EP 0 496 079 A2 requires a high level of concomitant analytical control measures in order to ensure that the quality of these products remains constant.

It has now been found that it is possible, by reacting a polycarboxy component with a polyhydroxy component which contains epoxide groups, to carry out the preparation of such water-dilutable acrylate copolymers in a more simple, more rapid and more reproducible manner.

The invention accordingly relates to a process for the preparation of water-dilutable coating binders based on acrylate copolymers, which are obtained by reacting a polycarboxy component with a polyhydroxy component followed by at least partial neutralization of the carboxyl groups, which is characterized in that (A) from 15 to 40% by weight, based on solids content, of an acrylate copolymer as polycarboxy component having an acid number of from 70 to 240 mg of KOH/g, preferably from 100 to 200 mg of KOH/g, which has been prepared in the form of a solution polymer from (Aa) from 67 to 90% by weight of alkyl (meth)acrylates which contain an alkyl radical of 1 to 12 carbon atoms, it being possible for these esters to be replaced in a proportion of up to 50% by weight by aromatic vinyl compounds, preferably styrene, and (Ab) from 10 to 33% by weight of $\alpha,\beta$-ethylenically unsaturated carboxylic acids, preferably (meth)acrylic acid, is mixed with (B) from 60 to 85% by weight, based on solids content, of an acrylate copolymer as polyhydroxy component having a hydroxyl number of from 90 to 250 mg of KOH/g, preferably from 110 to 180 mg of KOH/g, and an epoxide equivalent of from 0.7 to 26.0 milliequivalents/100 g of solids, which has been prepared in the form of a solution polymer from (Ba) from 40 to 79.9% by weight of alkyl (meth)acrylates which contain an alkyl radical of 1 to 12 carbon atoms, it being possible for these esters to be replaced in a proportion of up to 50% by weight of aromatic vinyl compounds, preferably styrene, (Bb) from 20 to 59.9% by weight of monoesters of (meth)acrylic acid with diols, which contain an alkylene radical of 2 to 4 carbon atoms or an oxyalkylene radical of 6 to 12 carbon atoms, and (Bc) from 0.1 to 3% by weight of a monomer which contains epoxide groups, the data for the acid number and hydroxyl number always relating to the solids content and the sums of the percentages for components (A) and (B) and, respectively, (Aa) and (Ab) and (Ba) to (Bc) necessarily giving 100 in each case, with the proviso that the mixture has an acid number of at least 15 mg of KOH/g, the solvent is removed in vacuo until the solids content of the batch is at least 95% by weight, the batch is diluted with an auxiliary solvent to a solids content of from 85 to 93% by weight, and then the mixture is maintained at a temperature of from 100° to 150° C., preferably from 110° to 130° C., until the epoxide equivalent of the batch has fallen to less than 0.2 milliequivalent/100 g of solids.

The invention also relates to the use of the binders prepared by this process, in combination with crosslinking components and optionally with other coating binders, for the formulation of water-thinnable baking enamels having a low content of organic auxiliary solvents.

In comparison with the process described in EP 0 496 079 A2 it is possible with the aid of the process according to the invention to prepare water-dilutable acrylate copolymers of similar composition with a simple procedure, a short duration of reaction and without risk of gelation.

Components (A) and (B) are prepared in a known manner by solution polymerization, preferably in alcohols or glycol ethers. In this polymerization the monomers are employed in the proportions indicated in the main claim.

Monomers which are used as components (Aa) and/or (Ba) are (meth)acrylic esters of alkanols of 1 to 12 carbon atoms and also, if desired, proportions—that is, up to 50% by weight—of aromatic vinyl monomers, especially styrene.

Component (Ab) preferably comprises acrylic or methacrylic acid, although it is possible for other $\alpha,\beta$-ethylenically unsaturated carboxylic acids such as maleic acid and its monoesters to be employed if desired.

As component (Bb) monoesters of (meth)acrylic acid with diols, which contain 2 to 4 carbon atoms, are employed, such as ethylene glycol, propylene glycol and butylene glycol and/or the corresponding isomeric compounds. In addition, it is also possible to use monoesters of alkanediols of 6 to 12 carbon atoms which contain ether groups, for example tri- or corresponding poly-ethylene glycol mono(meth)acrylates and/or di- or corresponding poly-propylene glycol mono (meth)acrylates.

Monomers containing epoxide groups as component (Bc) are preferably glycidyl (meth)acrylate and/or glycidyl allyl ether.

The polycarboxy component (A) has an acid number of from 70 to 240 mg of KOH/g, preferably from 100 to 200 mg of KOH/g.

The hydroxyl number of the polyhydroxy component (B) is between 90 and 250 mg of KOH/g, preferably between 110 and 180 mg of KOH/g, and the epoxide equivalent is from 0.7 to 26.0 milliequivalents/100 g of solids.

Components (A) and (B) are mixed in a proportion, based on solids content, of between 15:85 and 40:60, with the proviso that the mixture has an acid number of at least 15 mg of KOH/g. Subsequently the solvents are substantially removed in vacuo and are replaced in part by auxiliary solvents such as alcohols or glycol ethers, such that the solids content of the mixture is from 85 to 93% by weight.

The reaction of the polycarboxy component (A) with the polyhydroxy component (B) which contains epoxide groups is carried out at from 100° to 150° C., preferably at from 110° to 130° C., until the epoxide equivalent of the batch has fallen to less than 0.2 milliequivalent/100 g of solids. An appropriate neutralizing agent, such as ammonia and/or an alkylamine and/or an alkanolamine, is then added, and the batch is diluted with water to the desired solids content.

The binders prepared in accordance with the invention are used, in combination with crosslinking components and optionally with other coating binders, for the formulation of baking enamels having a very low content of organic auxiliary solvents.

The binders are particularly suitable for the production of water-dilutable basecoats as are employed, for example, in the production-line finishing of cars for two-coat finishes consisting of a coloured and/or special-effect basecoat and a clearcoat.

Such water-dilutable basecoats additionally contain—optionally in combination with additional water-dilutable binders—crosslinking components, preferably amino resins and/or blocked polyisocyanates, and also the additives, fillers and pigments which are familiar to the person skilled in the art.

Suitable additional water-dilutable binders, which can also be used as paste resins, are, in particular, polyester resins, polyacrylate resins and polyurethane resins.

The water-dilutable basecoats are applied in a known manner in combination with clearcoats and are crosslinked at temperatures of up to 160° C.

The examples which follow illustrate the invention without limiting its scope. All parts and percentages are by weight unless stated otherwise.

1. Preparation of the Polycarboxy Components (A) and Polyhydroxy Components (B) Used in the Examples The copolymers were prepared in a known manner by solution polymerization in isopropanol, in accordance with a calculated solids content of 50% by weight for components (A) and 65% by weight for components (B). The quantitative proportions and characteristics are compiled in Table 1.

2. Examples 1 to 5

Preparation of the Acrylate Copolymers (AB1) to (AB5)

Components (A) and (B) are mixed in the proportions indicated in Table 2. The isopropanol is removed in vacuo until the solids content of the batch is at least 95% by weight. After dilution of the batch with dipropylene glycol monomethyl ether to a solids content of about 90% by weight, the mixture is maintained at a temperature of from 110° to 120° C. until the epoxide equivalent of the batch has fallen to less than 0.2 milliequivalent/100 g of solids. After the end of the reaction the batch is cooled to 95° C., neutralized and diluted with deionized water.

The characteristics of the products according to Examples 1 to 5 are likewise to be found in Table 2.

Analytical Determination of the Epoxide Equivalent Milliequivalents of Epoxide Groups/100 g of Solids About 0.2 g of the sample is weighed accurately on an analytical balance and is dissolved with gentle heating in 25 ml of a mixture of 4 parts of dichloromethane/1 part of glacial acetic acid. After the solution has been cooled to room temperature 0.5 g of tetrabutylammonium iodide is added. Following the addition of 3 drops of crystal violet (0.1% in glacial acetic acid) the mixture is titrated with 0.1N perchloric acid in glacial acetic acid, from blue-violet until the change-over point to grass green (green without a hint of blue!). In parallel with the sample, a control with no resin added must be determined.

$$\text{Epoxide equivalent} = \frac{(A - B) \times 0.1 \times f}{\text{Sample weight (g)}}$$

A=Consumption in ml of 0.1N perchloric acid for sample
B=Consumption in ml of 0.1N perchloric acid for control
f=Factor for 0.1N perchloric acid Determination of the Factor of 0.1N Perchloric Acid About 200 mg of potassium hydrogen phthalate AR are weighed accurately on an analytical balance in a 300 ml conical flask, 30 ml of glacial acetic acid and 3 drops of crystal violet (0.1% in glacial acetic acid) are added, and the mixture is titrated with 0.1N perchloric acid in glacial acetic acid to the colour change-over point from violet to a definite green.

$$f = \frac{W}{C \times 20.422}$$

W=Weight of potassium hydrogen phthalate AR in milligrams
C=Consumption in ml of 0.1N perchloric acid in glacial acetic acid

TABLE 1

|  |  | COMPONENT | |
|---|---|---|---|
|  |  | (A1) | (A2) |
| (Aa) | Ethyl acrylate | — | 25 |
|  | Butyl acrylate | — | 35 |
|  | 2-Ethylhexyl acrylate | 30 | — |
|  | Methyl methacrylate | — | 30 |
|  | Isobutyl methacrylate | 27 | — |
|  | Styrene | 18.5 | — |
| (Ab) | Acrylic acid | — | 10 |
|  | Methacrylic acid | 24.5 | — |
|  | Acid number mg of KOH/g | 160 | 78 |

|  |  | COMPONENT | | | | |
|---|---|---|---|---|---|---|
|  |  | (B1) | (B2) | (B3) | (B4) | (B5) |
| (Ba) | Ethyl acrylate | — | 19 | — | — | — |
|  | Butyl acrylate | — | 14 | — | 30 | 23 |
|  | 2-Ethylhexyl acrylate | 26 | — | — | — | — |
|  | Methyl methacrylate | — | 27 | 20 | — | 12 |
|  | Isobutyl methacrylate | 18 | — | 24 | 10 | 22.6 |
|  | Styrene | 24.2 | — | — | 31.8 | 10 |
| (Bb) | 4-Hydroxybutyl acrylate | — | 9 | 33 | 22 | 15 |
|  | 2-Hydroxyethyl methacrylate | 31 | 30 | 21 | — | 17 |
|  | Tripropylene glycol methacrylate | — | — | — | 6 | — |
| (Bc) | Glycidyl acrylate | — | 1 | — | — | 0.4 |
|  | Glycidyl methacrylate | 0.8 | — | 1 | 0.2 | — |
|  | Glycidyl allyl ether | — | — | 1 | — | — |
|  | Hydroxyl number mg of KOH/g | 137 | 169 | 228 | 95 | 134 |
|  | Epoxide equivalent meq/100 g of solid resin | 5.6 | 7.8 | 15.8 | 1.4 | 3.1 |

TABLE 2

(all quantities relate to solids content)

| Example | 1 (AB1) | 2 (AB2) | 3 (AB3) | 4 (AB4) | 5 (AB5) |
|---|---|---|---|---|---|
| Quantity/Component (A) | 25 (A1) | 30 (A1) | 40 (A2) | 20 (A2) | 25 (A2) |
| Quantity/Component (B) | 75 (B1) | 70 (B2) | 60 (B3) | 80 (B4) | 75 (B5) |
| Acid number mg of KOH/g of the mixture | 40 | 48 | 31 | 16 | 20 |
| Solids content % by wt.[1] | 91.5 | 91.3 | 92.0 | 90.8 | 91.5 |
| Addition reaction min/°C. | 30/120 | 15/115 | 30/115 | 60/120 | 45/120 |
| Epoxide equivalent[2] meq/100 g of solid resin | 0.12 | 0.18 | 0.08 | 0.12 | 0.09 |

TABLE 2-continued (all quantities relate to solids content)

| Example | 1 (AB1) | 2 (AB2) | 3 (AB3) | 4 (AB4) | 5 (AB5) |
|---|---|---|---|---|---|
| Neutralizing agent | DMA | TEA | DMA | DMA | DMA |
| Degree of neutralization (% of the COOH groups) | 90 | 80 | 100 | 100 | 100 |
| Dilution with H$_2$O to % by wt. solids content/supply form | 42.3 | 43.5 | 41.8 | 43.2 | 44.6 |
| pH of 10% strength solution (20° C.) | 8.7 | 8.3 | 8.9 | 8.8 | 8.7 |
| % by wt. of organic solvent and amine in supply form | 6.3 | 7.5 | 5.7 | 5.5 | 5.6 |

[1)] % by weight solids content of the mixture after the addition of dipropylene glycol monomethyl ether
[2)] after the end of the reaction
DMA = Dimethylethanolamine
TEA = Triethylamine

3. Coating Performance Testing of the Acrylate Copolymers (AB1) to (AB5)

3.1. Clearcoats in a Metallic Basecoat/Clearcoat System and White Coating Materials The formulations are compiled in Tables 3 and 4.
The indices 1) to 9) in Tables 3 and 4 denote:
1) Commercial melamine resin, of moderate reactivity, 85% strength in water (Cymel® 373, Cyanamid)
2) Commercial silicone levelling agent for water-thinnable coating materials (Additol® XW 329, Hoechst)
3) Commercial light stabilizer combination of benzotriazole UV absorber (Tinuvin® 1130, Ciba-Geigy) with sterically hindered amine (Tinuvin® 292, Ciba-Geigy) in a ratio of 1:1
4) Commercial antifoam based on acetylenediols (Surfinol® E 104/50%, Air Products)
5) Fully deionized water
6) HS value, as a measure of the content of volatile organic solvents:

$$HS\ value = \frac{\%\ by\ wt.\ of\ coating\ solids\ content\ (CS) \times 100}{\%\ by\ wt.\ of\ CS + \%\ by\ wt.\ of\ aux.\ solvent + \%\ by\ wt.\ of\ amine}$$

7) Flow time according to DIN 53211/23° C. in seconds
8) Content of organic auxiliary solvents and amine in % by weight
9) Commercial titanium dioxide (Kronos® CL 310, Kronos)

The batches of coating material were adjusted to a pH of from 7.5 to 9.0 with dimethylethanolamine and were diluted with deionized water to a viscosity corresponding to a flow time according to DIN 53211/23° C. of about 32 seconds.

The clearcoats were applied to coated steel panels (zinc phosphatization, cathodic electrodeposition coating, filler, metallic basecoat, using products which are employed in the automotive industry) by spraying at 23° C. and a relative atmospheric humidity of 60%. After a flash-off time of 10 minutes and a preliminary drying time of 10 minutes at 80° C., the coatings were baked for 30 minutes at 140° C.

The white coating materials were applied to coated steel panels (zinc phosphatization, cathodic electrodeposition coating, filler, using products which are employed in the automotive industry) in an analogous manner and baked.

The results are compiled in Tables 5 and 6, where indices (1) to (4) denote:
(1) measured with a Byk Type Colourgloss 2 gloss meter at an angle of 60°
(2) an acetone-soaked cotton wool pad is placed on the coating film and the time taken for the film to soften is measured
(3)
+: the coating film is unchanged after storage in water at 40° C. for 240 hours
(+): the coating film has softened after storage in water at 40° C. for 240 hours, but is regenerated after storage at room temperature for about 2 hours
(4) with the coating applied in a wedge formation (max. 60 μm, min. 15 μm), blistering and/or runs are noted in the baked coating film from the coat thickness indicated.

TABLE 3

| Acrylate copolymer (AB)/ | Clearcoat | | | |
|---|---|---|---|---|
| supply form | 1 | 2 | 3 | 4 |
| (AB1) | 75.0 | | | |
| (AB2) | | 69.1 | | |
| (AB4) | | | 74.1 | |
| (AB5) | | | | 70.6 |
| Melamine resin[1)] | 16.0 | 15.3 | 9.4 | 12.4 |
| Levelling agent[2)] | 0.2 | 0.2 | 0.3 | 0.3 |
| Light stabilizer[3)] | 1.2 | 1.2 | 1.4 | 1.3 |
| Antifoam[4)] | 0.5 | 0.5 | 0.5 | 0.5 |
| H$_2$O[5)] 7.1 | 13.8 | 14.3 | 14.9 | |
| | 100 | 100 | 100 | 100 |
| (AB): MF resin*[)] | 70:30 | 70:30 | 80:20 | 75:25 |
| Solids content in % by wt. | 46.9 | 44.6 | 42 | 43.7 |
| HS value[6)] | 90.4 | 89.2 | 90.7 | 91.2 |
| pH | 8.7 | 8.7 | 8.7 | 8.6 |
| Viscosity[7)] | 30 | 30 | 30 | 30 |
| Solvent + amine in the coating material[8)] | 5.0 | 5.4 | 4.3 | 4.3 |

*[)]based on solids

TABLE 4

| Acrylate copolymer (AB)/ | White coating material | |
|---|---|---|
| supply form | 1 | 2 |
| (AB1) | 46.3 | |
| (AB3) | | 51.0 |
| Melamine resin[1)] | 9.9 | 10.7 |
| TiO$_2$[9)] | 24.8 | 23.3 |
| Levelling agent[2)] | 0.2 | 0.2 |
| Antifoam[4)] | 0.4 | 0.4 |
| H$_2$O[5)] | 18.4 | 14.4 |
| | 100 | 100 |
| (AB):MF resin*[)] | 70:30 | 70:30 |
| Solids content in % by wt. | 53.2 | 54.1 |
| HS value[6)] | 94.5 | 94.6 |
| pH | 8.5 | 8.4 |
| Viscosity[7)] | 32 | 35 |
| Solvent + amine in the coating material[8)] | 3.1 | 3.1 |

*[)]based on solids

TABLE 5

| Clearcoat | 1 | 2 | 3 | 4 |
|---|---|---|---|---|
| Pendulum hardness DIN 53157 in sec. | 165 | 180 | 190 | 195 |
| Cross-hatch (DIN 53151) | 0–1 | 0–1 | 0 | 0–1 |
| Gloss (1) | 89 | 86 | 86 | 84 |
| Acetone resistance in min. (2) | 2 | 3 | 2 | 2 |
| Water resistance (3) | (+) | (+) | + | + |
| Blistering tendency, μm (4) | 37 | 39 | 40 | 40 |

TABLE 5-continued

| Clearcoat | 1 | 2 | 3 | 4 |
|---|---|---|---|---|
| Tendency to run, μm (4) | 42 | 40 | 40 | 38 |

TABLE 6

| White coating material | 1 | 2 |
|---|---|---|
| Pendulum hardness DIN 53157 in sec. | 175 | 160 |
| Cross-hatch (DIN 53151) | 1–2 | 2 |
| Gloss (1) | 82 | 78 |
| Acetone resistance in min. (2) | 2 | 2 |
| Water resistance (3) | (+) | (+) |
| Blistering tendency, μm (4) | 41 | 37 |
| Tendency to run, μm (4) | 40 | 42 |

3.2. Lime Green Water-Dilutable Basecoat
3.2.1. Preparation of a Green Pigment Paste 20 parts of a chlorinated phthalocyanine pigment are predispersed using a dissolver in a mixture of 20 parts of a paste resin according to EP 0438090 A1 (paste resin 1), 35 parts of butoxyethanol and 0.5 parts of dimethylethanolamine, and this mixture is then dispersed in a bead mill. The pigment paste is subsequently diluted with 24.5 parts of deionized water.

3.2.2. Preparation of a White Pigment Paste 60 parts of titanium dioxide are predispersed using a dissolver in a mixture of 10 parts of a paste resin according to EP 0438090 A1 (paste resin 1), 15 parts of butoxyethanol and 0.5 parts of dimethylethanolmine and this mixture is then dispersed in a bead mill. The pigment paste is subsequently diluted with 14.5 parts of deionized water.

3.2.3. Preparation and Application of the Lime Green Water-Dilutable Basecoat

In a dissolver, 25 parts of the acrylate copolymer (AB3) are neutralized with 0.5 part of dimethylethanolamine. 8 parts of a 2:1 mixture of butylglycol and butyldiglycol, 2 parts of a commercially available antifoam, 4 parts of an acidic acrylate thickener, 12 parts of a paste resin according to EP 0438090 A1 (paste resin 1) and 5 parts of crosslinking agent (Cymel 323) are added. After homogenization of the mixture, 10 parts of the green pigment paste obtained under 3.2.1. and 3 parts of the white pigment paste obtained under 3.2.2. are added to the mixture. Homogeneous mixing is again carried out, and the mixture is diluted with 30.5 parts of deionized water.

The basecoat is applied to a phosphatized bodywork panel, which has been precoated with a cathodic deposition coat and with a filler, by spraying, in a dry-film thickness of 20 μm. This coating is then flashed off at room temperature for 10 minutes, predried at 80° C. for 10 minutes, and overcoated with a commercial, acrylate resin-based automotive production-line clearcoat, which cures by means of melamine resin, in a dry-film thickness of 35 μm. The two-coat topcoat is baked at 130° C. (panel temperature) for 30 minutes.

The multi-coat paint system thus obtained meets, in terms of its optical and mechanical properties, all of the requirements set by the automotive industry.

We claim:

1. A process for the preparation of water-dilutable coating binders based on acrylate copolymers, which are obtained by reacting a polycarboxy component with a polyhydroxy component followed by at least partial neutralization of the carboxyl groups, wherein the process comprises:
   mixing
   (A) from 15 to 40% by weight, based on solids content, of an acrylate copolymer as the polycarboxy component having an acid number of from 70 to 240 mg of KOH/g, which has been prepared in the form of a solution polymer from:
      (Aa) from 67 to 90% by weight of alkyl (meth) acrylates which contain an alkyl radical of 1 to 12 carbon atoms, it being possible for these esters to be replaced in a proportion of up to 50% by weight by aromatic vinyl compounds, and
      (Ab) from 10 to 33% by weight of α,β-ethylenically unsaturated carboxylic acids,
   with
   (B) from 60 to 85% by weight, based on solids content, of an acrylate copolymer as the polyhydroxy component having a hydroxyl number of from 90 to 250 mg of KOH/g, and an epoxide equivalent of from 0.7 to 26.0 milliequivalents/100 g of solids, which has been prepared in the form of a solution polymer from:
      (Ba) from 40 to 79.9% by weight of alkyl (meth) acrylates which contain an alkyl radical of 1 to 12 carbon atoms, it being possible for these esters to be replaced in a proportion of up to 50% by weight of aromatic vinyl compounds,
      (Bb) from 20 to 59.9% by weight of monoesters of (meth)acrylic acid with diols, which contain an alkylene radical of 2 to 4 carbon atoms or an oxyalkylene radical of 6 to 12 carbon atoms, and
      (Bc) from 0.1 to 3% by weight of a monomer which contains epoxide groups,
      wherein the data for the acid number and hydroxy number always relates to the solids content and the sums of the percentages for components (A) and (B) and, respectively, (Aa) and (Ab) and (Ba) to (Bc) necessarily giving 100 in each case,
   with the proviso that the mixture has an acid number of at least 15 mg of KOH/g;
   removing the solvent in vacuo until the solids content of the batch is at least 95% by weight;
   diluting the batch with an auxiliary solvent to a solids content of from 85 to 93% by weight; and
   maintaining the mixture at a temperature of from 100° to 150° C., until the epoxide equivalent of the batch has fallen to less than 0.2 milliequivalent/100 g of solids.

2. A process according to claim 1, wherein glycidyl (meth)acrylate and/or glycidyl allyl ether is employed as component (Bc).

3. Water-dilutable coating binders based on acrylate copolymers, produced according to the process of claim 1.

4. Water-dilutable coating binders based on acrylate copolymers, produced according to the process of claim 2.

5. A process for the preparation of water-thinnable baking enamels with a low content of organic auxiliary solvents, comprising, combining the binders as claimed in claim 3 with crosslinking components and optionally with other coating binders.

6. A process for the preparation of water-thinnable baking enamels with a low content of organic auxiliary solvents, comprising, combining the binders as claimed in claim 4 with crosslinking components and optionally with other coating binders.

7. A process for the preparation of water-dilutable basecoats, comprising, combining the binders as claimed in claim 3 with crosslinking components, and further coating raw materials to produce water-dilutable basecoats.

8. A process for the preparation of water-dilutable basecoats, comprising, combining the binders as claimed in claim 4 with crosslinking components, and further coating raw materials to produce water-dilutable basecoats.

9. A process for coating a substrate with a two-coat paint system, comprising:

applying a basecoat containing the binders of claim 3 to the substrate; and applying a further clearcoat to the substrate.

10. A process for coating a substrate with a two-coat paint system, comprising:

applying a basecoat containing the binders as claimed in claim 4 to the substrate; and applying a further clearcoat to the substrate.

11. A process for the preparation of water-dilutable binders according to claim 1, wherein the acrylate copolymer (A) has an acid number from 100 to 200 mg of KOH/g.

12. A process for the preparation of water-dilutable binders according to claim 1, wherein the acrylate copolymer (B) has a hydroxyl number from 110 to 180 mg of KOH/g.

13. A process for the preparation of water-dilutable binders according to claim 1, wherein the mixture is maintained at a temperature of from 110° to 130° C., until the epoxide equivalent of the batch has fallen to less than 0.2 milliequivalent/100 g of solids.

14. A process for the preparation of water-dilutable binders according to claim 1, wherein the aromatic vinyl compounds of (Aa) comprise styrene.

15. A process for the preparation of water-dilutable binders according to claim 1, wherein the $\alpha,\beta$-ethylenically unsaturated carboxylic acids of (Ab) comprise (meth)acrylic acid.

16. A process for the preparation of water-dilutable binders according to claim 1, wherein the aromatic vinyl compounds of (Ba) comprise styrene.

* * * * *